(12) United States Patent
Brozat

(10) Patent No.: US 8,121,778 B2
(45) Date of Patent: Feb. 21, 2012

(54) METHOD, CONTROL SYSTEM AND SOFTWARE PROGRAM FOR EXECUTING THE METHOD FOR OPTIMIZED USE OF THE AIRSIDE CAPACITIES OF AN AIRPORT

(75) Inventor: Raimund Brozat, Bensheim (DE)

(73) Assignee: Fraport AG Frankfurt Airport Services (DE)

( * ) Notice: Subject to any disclaimer, the term of this patent is extended or adjusted under 35 U.S.C. 154(b) by 724 days.

(21) Appl. No.: 12/294,425

(22) PCT Filed: Mar. 22, 2007

(86) PCT No.: PCT/EP2007/002560
§ 371 (c)(1),
(2), (4) Date: Sep. 24, 2008

(87) PCT Pub. No.: WO2007/110194
PCT Pub. Date: Oct. 4, 2007

(65) Prior Publication Data
US 2009/0171557 A1 Jul. 2, 2009

(30) Foreign Application Priority Data

Mar. 24, 2006 (DE) .......................... 10 2006 013 722
Feb. 23, 2007 (DE) .......................... 10 2007 009 005

(51) Int. Cl.
*G06G 7/70* (2006.01)
*G06G 7/76* (2006.01)
(52) U.S. Cl. ....................... 701/120; 705/7.11; 705/7.27
(58) Field of Classification Search .................. 701/120; 705/7.11–7.27
See application file for complete search history.

(56) References Cited

U.S. PATENT DOCUMENTS

| 5,265,023 | A | | 11/1993 | Sokkappa | 364/439 |
| 6,076,067 | A | * | 6/2000 | Jacobs et al. | 705/7.22 |
| 6,282,487 | B1 | * | 8/2001 | Shiomi et al. | 701/120 |
| 6,314,361 | B1 | * | 11/2001 | Yu et al. | 701/120 |
| 6,463,383 | B1 | * | 10/2002 | Baiada et al. | 701/120 |
| 7,151,995 | B2 | * | 12/2006 | Jasselin | 701/120 |
| 2002/0177943 | A1 | * | 11/2002 | Beardsworth | 701/120 |
| 2003/0139875 | A1 | * | 7/2003 | Baiada et al. | 701/120 |
| 2004/0039518 | A1 | * | 2/2004 | Jasselin | 701/120 |

(Continued)

FOREIGN PATENT DOCUMENTS

GB 2 327 517 1/1999

(Continued)

OTHER PUBLICATIONS

International Preliminary Report on Patentability received in corresponding PCT Application Serial No. PCT/EP/2007/002560.

(Continued)

*Primary Examiner* — Kaitlin Joerger
*Assistant Examiner* — Patrick Cicchino
(74) *Attorney, Agent, or Firm* — Hayes Soloway P.C.

(57) ABSTRACT

A method for optimized use of the airside capacities of an airport, in which by means of electronic data processing system a current operating capacity of the airport and a current traffic demand are calculated. Information for an optimized use of the available resources is determined and outputted based on the current operating capacity and the current traffic demand. Further provided are an information system and a control system for optimum runway use and a software program for executing the method.

24 Claims, 5 Drawing Sheets

U.S. PATENT DOCUMENTS

2006/0259232 A1* 11/2006 Huthoefer et al. ............ 701/120
2008/0262709 A1    10/2008 Pick et al.
2010/0332112 A1* 12/2010 Pschierer et al. ............ 701/120

FOREIGN PATENT DOCUMENTS

| GB | A-2 327517 | 1/1999 |
| WO | WO2006/042490 | 4/2006 |
| WO | WO 2006/042490 | 4/2006 |

OTHER PUBLICATIONS

International Search Report and Written Opinion received in corresponding PCT Application Serial No. PCT/EP/2007/002560.

Official Action issued in German corresponding Patent Application, dated Jun. 20, 2008.

Australian Official Action, Appln. No. 2007229687, dated Mar. 4, 2011 (3 pages).

* cited by examiner

METHOD, CONTROL SYSTEM AND SOFTWARE PROGRAM FOR EXECUTING THE METHOD FOR OPTIMIZED USE OF THE AIRSIDE CAPACITIES OF AN AIRPORT

The present invention relates to a method, a control system and a software program for executing the method for optimized use of the airside capacities of an airport, and an information system which graphically displays information calculated by means of the method.

Bottleneck situations developing at airports, including major airports, e.g. caused by a weather-related decrease in runway capacity, are today predicted very late and, in terms of their extent, only very inaccurately. This makes early and adjusted reactions by appropriate control measures impossible. The consequences in most cases are an overloading or a non-optimum utilization of the remaining airside system capacities due to measures that are not coordinated with each other and may possibly even be counterproductive.

One main reason resides in that the various actors (air traffic control, airline, airport) have no complete and consistent information about the overall situation that develops. Further, any sufficiently precise and complete calculation model permitting quantitative statements on the available airport capacity (main focus: runway capacity) in the form of a prediction tool does not so far exist.

In addition, present-day working methods that are found in the tactical area are not suitable for dealing with bottleneck situations adequately. As a rule, the lack in planning leads to a disproportionate deterioration in the overall system performance and/or a non-optimum utilization of the remaining system capacities in bottleneck situations.

The following effects may be observed as the resultant consequences for traffic handling:
- a disproportionately great increase in delays in the event of capacity bottlenecks;
- excess reduction of the control value for the maximum traffic inflow for lack of knowledge of the development in time of, e.g., a weather-related capacity bottleneck;
- non-optimum use of the available runway capacity for take-offs and landings;
- unilateral preferential treatment of, as a rule, the inbound traffic due to a lack of coordination between approaching and departing aircraft.

Although inbound traffic (landings) and outbound traffic (take-offs) share the runway(s) as an airport resource, a capacity manager for best possible use of the runway capacity, which is scarce owing to take-offs and landings, is not available.

The present invention provides a method for optimized use of the airside capabilities of an airport, in which by means of an electronic data processing system a current operating capacity of the airport and a current traffic demand are calculated. Information for an optimized use of the available resources is determined and outputted based on the current operating capacity and the current traffic demand. Application of the method according to the invention in the form of a software program, which will be referred to as "CAPMAN" in the following, permits a control of the air traffic at the airport in such a way that a best possible use of the available airside airport capacities (best use of available capacity), a tapping of hitherto unused capacity reserves (unlock "hidden" capacity), and an increase in punctuality of the air traffic and/or a reduction in delays are achieved.

For an automatic optimization of the air-to-air process, CAPMAN may be networked with tactical traffic control devices of air traffic control (e.g., AMAN) and apron control (e.g., DMAN).

In a preferred embodiment, the current operating capacity is continuously calculated from airport-specific infrastructure, operational, and weather characteristic values as well as from current operating, weather, and weather forecast data entered online. The current traffic demand is continuously calculated from flight plan data and flight status data entered online. Here, an expected and a cumulative traffic demand as well as a ratio in the cumulative traffic demand between arrivals and departures (ratio of demand) are calculated. Based on the operating capacity prediction and the ratio between arrivals and departures, a take-off capacity and a landing capacity are determined for each runway in predetermined time intervals. In this way, the take-off and the landing capacities are considered in combination and use of the airside resources can be optimized.

The method is realized in an advantageous manner by a software program which comprises four software modules: a first software module (CMON) for calculating a current operating capacity; a second software module (DMON) for calculating a current traffic demand; a third software module (CAPO) for calculating an optimum use of capacity; and a fourth software module (PMON) for calculating a punctuality; the first and second software modules including interfaces to external systems via which they receive current online data; the first and second software modules mutually interchanging data; and the first and second software modules delivering data to the third software module, which calculates therefrom and outputs information for an optimized use of the available resources. The fourth software module receives data from the first and second software modules and calculates therefrom and outputs an achievable, a predicted, and an actually achieved punctuality. Owing to the online networking with, for example, the Deutscher Wetterdienst (German Meterorological Service), the air traffic control systems and the existing airport information systems, the software program has permanent access to the current data that includes, e.g., changes in weather and unexpected flight delays, and is able to respond even in anticipation of upcoming capacity bottlenecks. With the software modules being structured in the form of respectively independent modules having defined interfaces to the outside and among one another, this allows simpler maintenance of the program, easier potential upgrading, and an adjustment to specific circumstances and conditions of an airport.

Further advantages and exemplary embodiments will become apparent from the description below with reference to the drawings.

Frankfurt International Airport (FRA) will serve as an exemplary airport throughout the description. The method according to the invention, realized by the CAPMAN software program, which runs within an information system or a control system, integrates in the existing system landscape of an airport at the interface between the flight, airport, and weather data, on the one hand, and the tactical traffic control devices of air traffic control (e.g., AMAN) and apron control (e.g., DMAN) or at the air/runway and runway/air interfaces, more particularly for inbound and outbound traffic jointly.

The technical concept of CAPMAN permits three types of use. First, a use as an information system for showing the traffic demand established, the capacities, and the punctualities on a screen. In case of deviations from the desired condition, the traffic control staff can initiate target-oriented countermeasures on the basis of solid findings. Second, a use as a control system for optimizing runway use and, third, a use as part of a superordinate traffic control system (air traffic control/airport) by an automatic transfer of the CAPMAN results to AMAN and DMAN for air-to-air process optimization.

Figure 1:
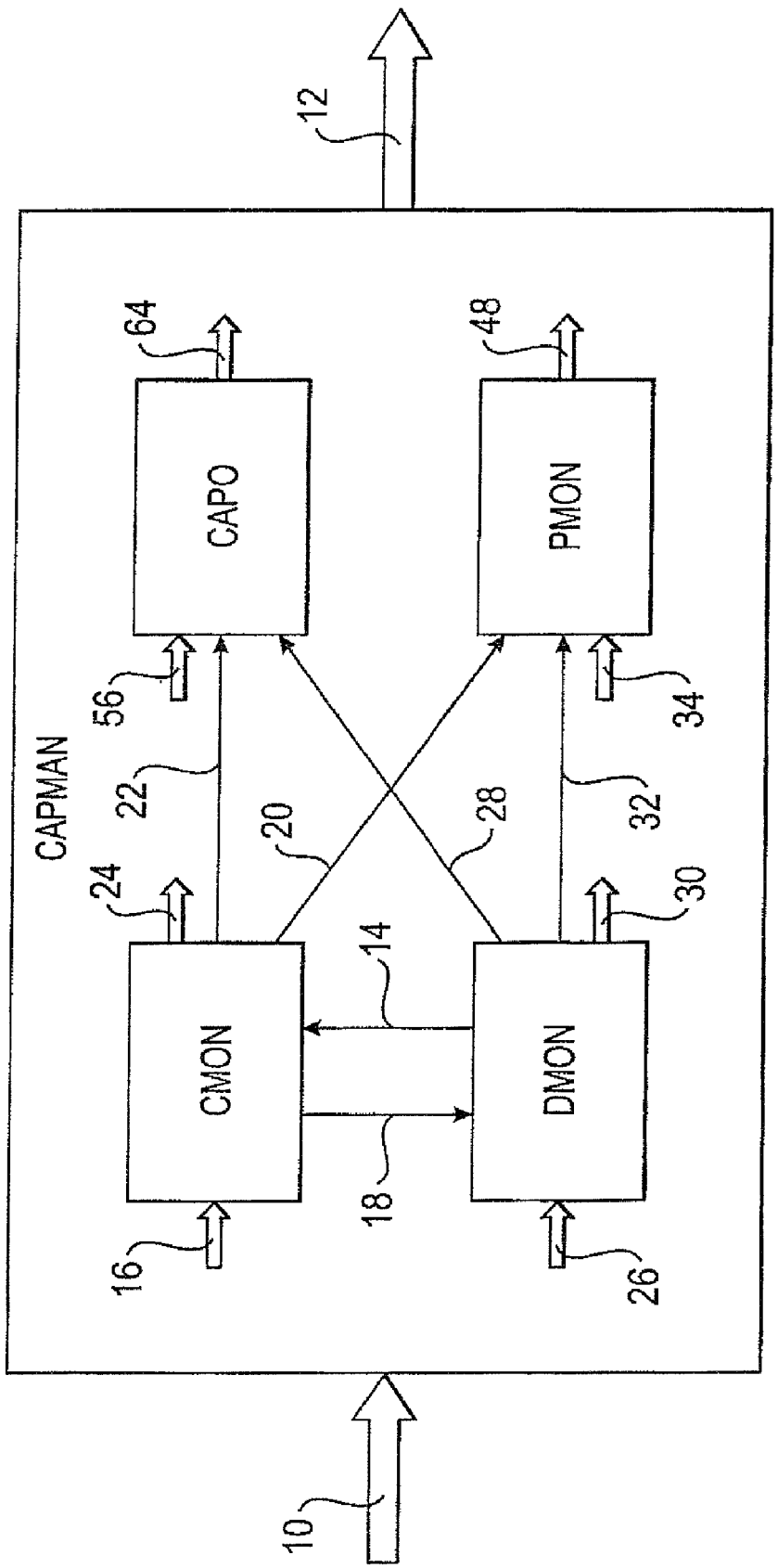
FIG. 1 shows a schematic illustration of the modules of the software program for executing the method according to the invention.

FIG. 1 shows a schematic illustration of the CAPMAN software program for executing the method according to the invention, with its modules CMON, DMON, CAPO, and PMON and the data exchange between and among the individual modules, and the interfaces to the outside, with internal interfaces being shown by a simple arrow and interfaces to the outside by a double arrow. At the input interface 10 the following is entered: online operating data relating to, e.g., operational interruptions, runways in operation, online weather and weather forecast data as supplied, e.g., by the German Meteorological Service DWD, online flight plan and flight status data. At the output interface 12 the following is output, for example: information for an optimized use of the available runways, take-off capacity for each runway in predetermined time intervals, landing capacity for each runway in predetermined time intervals, operating capacity predictions, current traffic demand, traffic flow, cumulative traffic demand, achievable punctuality, predicted punctuality, and actually achieved punctuality.

The individual modules will be described separately below.

CMON Module

The CMON (Capacity Monitor) software module calculates the currently operationally available capacity, the operating capacity, and the prediction thereof as a function of all capacity-relevant influencing variables. The calculation and prediction of the operating capacity are allowed by a special CMON calculation algorithm.

The capacity of the airport is determined quite decisively by the available airport and air traffic control (ATC) infrastructure as well as by the weather. For calculating and for predicting the operating capacity, CMON continuously needs current data about the runways in use, i.e. the runways that are in operation, about operational interruptions, and about the weather, as well as weather forecasts that are as accurate as possible.

External data sources are the airport information system, air traffic control systems, and the weather information system of the meteorological service. Data interfaces to these systems are required for the provision of data online.

An intra-CAPMAN interface 14 to the DMON software module serves to obtain therefrom the current and the predicted aircraft mix for calculating the operating capacity, as well as the ratio of the cumulative traffic demand for calculating the arrival capacity and the departure capacity per floating hour. In this connection, aircraft mix means the number of so-called heavy aircraft having a high take-off weight (MTOW=Maximum Take-Off Weight) in proportion to the other aircraft.

The essential quantities for calculation in establishing the operating capacity are airport-specific characteristic values, which are very involved to determine. Some of them are derived from the results of extensive air traffic and weather data evaluations; for others special calculation algorithms have been developed.

The airport-specific characteristic values include operating characteristic values, infrastructure characteristic values and weather characteristic values, all of which are input into the CMON software module as input via the interface 16.

The operating characteristic value designates the operating value of an (independent) runway, taking into account the airport-specific boundary conditions such as, e.g., typical aircraft mix, reduced staggering distances, and other operating procedures having an effect on capacity.

The infrastructure characteristic value is established using a CAPMAN infrastructure algorithm that has been specially developed to determine it. This calculation algorithm takes into account the active runway configuration Ai (runways in use), the operational dependences between the runways having the characteristic value ki, and the unavailability of a runway, e.g. because of too high a tailwind component, and operational interruptions that are described by various characteristic values $k_B$ (e.g., for the failure of the instrument landing system ILS or for a change of operating direction).

For the prediction, the respective active runways are determined with the aid of the predicted wind conditions $W_D$.

$$I = f(Ai, ki, k_B, W_D)$$

The operating capacity is highly weather-dependent. Therefore, to determine it, all capacity-relevant weather-influencing factors and the quantitative influence thereof on the operating capacity need to be known.

Extensive weather data analyses constitute the basis for describing the influence of the weather on the operating capacity and led to the result that the temperature, wind direction, wind speed, visual range, cloud ceiling, precipitation and the nature thereof, but also weather phenomena such as, e.g., thunderstorms and icing need to be taken into consideration when calculating the operating capacity.

Weather characteristic values were derived for all relevant weather-influencing factors. These values are stored in tabular form in the CAPMAN system and are retrieved by the CAPMAN calculation algorithms depending on the current weather data and/or weather predictions.

The operating capacity $C_B$ is calculated from the infrastructure characteristic value I, the operating characteristic value B, and a correction value $k_C$, which is calculated from the following characteristic values: the temperature $k_T$ characteristic, the weather phenomenon $k_X$ characteristic, the wind $k_W$ characteristic, the aircraft mix kM characteristic, and the vision $k_S$ characteristic. The characteristics stored in tabular form are made use of for calculating the capacity as a function of current weather data and weather forecasts.

$$C_B = I*B - k_c$$

$$k_c = f(k_T, k_X, k_W, k_M, k_S)$$

The calculation of the current landing capacity $C_A$ results by using the current and/or the predicted demand ratio R (traffic demand ratio, i.e. ratio between landings and take-offs) according to the following formula.

$$C_A = R * C_B/(R+1)$$

The calculation of the current take-off capacity $C_D$ results by using the current and/or the predicted demand ratio R according to the following formula.

$$C_D = C_B/(R+1)$$

The operating capacity is a variable measure for the traffic throughput of the runway system per hour at a defined, variable punctuality level and taking variable operating and weather conditions into account.

The operating capacity data is transferred via intra-CAPMAN interfaces 18, 20, 22 to the DMON, PMON and CAPO modules for further processing. They may just as well be used by other partner systems via an external interface 24.

The operating capacity in the form of aircraft movements per hour, landings per hour and take-offs per hour (Mov/h, Arr/h, Dep/h) is made visible to the user via a human-machine interface (HMI) and depicted versus time as a band. The band width is characterized at the top by a sufficiently frequently reproducible maximum value (mode) which is attainable with an optimum runway use, while the lower boundary is determined by the value attained on an average (median).

DMON Module

The DMON (Demand Monitor) software module calculates an expected and a cumulative traffic demand as well as a ratio in the cumulative traffic demand between arrivals and departures.

The market basically produces a traffic demand which is documented by the flight plan and is characterized by capacity- and punctuality-relevant parameters such as amount (flights per hour), traffic mix (proportion of heavy aircraft) and ratio (proportion between arrivals and departures).

On account of flight delays and early arrivals, variable traffic mix, and ratio, the traffic demand is also a variable quantity that needs to be constantly recalculated.

The STA (scheduled time of arrival) and STD (scheduled time of departure) flight plan data determine the expected traffic demand long ahead. The DMON Demand Monitor receives the flight plan data online from the airport information system via the interface 10 or an interface 26 and calculates the traffic demand per floating hour on this basis.

When a projected aircraft movement becomes concrete, the STA/STD is replaced by the corresponding "estimate" times and "actual" times (flight status data), which are available to the DMON module likewise via the interface 10 and which the Demand Monitor takes appropriately into account in its calculation. External data sources are the airport information system, air traffic control systems and, if necessary, airline systems such as, e.g., SITA messages. Data interfaces to these systems are required for the provision of data online.

For calculating an overdemand and the cumulative traffic demand, DMON receives the current and predicted operating capacities for movements, take-offs and landings from the CMON module via the internal data interface 18.

The traffic demand for landings (Initial Arrival Demand) is calculated by adding up all STA/ETA times within one floating hour.

The traffic demand for take-offs (Initial Departure Demand) is calculated by adding up all STD/ETD times within one floating hour.

The total traffic demand (Initial Total Demand), or the traffic demand for short, is the sum of Initial Arrival Demand and Initial Departure Demand within one floating hour.

The cumulative traffic demand $D_k$ is calculated from the Initial Demand Di, the operating capacity $C_B$, the overdemand $O_a$ for arrivals and $O_d$ for departures, the predicted flow $F_p$ for the floating hour.

$$D_k = f(D_i, C_B, O_a, O_d, F_p)$$

DMON transmits the ratio and the aircraft mix of the traffic demand and the cumulative traffic demand via the intra-CAPMAN interface 14 to the CMON module for calculation of the operating capacities for movements, take-offs and landings, and the ratio of the cumulative traffic demand to the CAPO software module via the internal interface 28.

The cumulative traffic demand is further transmitted via an interface 32 to the PMON software module to calculate the punctuality.

The traffic demand and the cumulative traffic demand are made visible to the user in the form of aircraft movements per hour, landings per hour and take-offs per hour (Mov/h, Arr/h, Dep/h) via a human-machine interface 30 or the interface 12.

Furthermore, DMON establishes and displays the actual traffic flow of the past few hours.

PMON Module

The PMON (Punctuality Monitor) software module calculates the achievable (destination punctuality), the predicted, and the actually achieved punctuality as a function of all punctuality-relevant influencing variables. The calculation and prediction of the punctualities is effected by a special PMON calculation algorithm.

The PMON module receives the current and the predicted operating capacity for take-offs, landings, and aircraft movements from the CMON module via an intra-CAPMAN interface 20 for calculating the punctuality and the punctuality prediction.

The PMON module receives the current and the predicted cumulative traffic demand for take-offs, landings, and aircraft movements from the DMON module via an intra-CAPMAN interface 32 for calculating the punctuality and the punctuality prediction.

Just like the CMON calculation algorithm, the PMON calculation algorithm accesses the airport-specific characteristic values I, $k_M$, $k_S$, $k_W$ und $k_X$ already discussed further above, which are all entered into the PMON software module as input via an interface 34.

The PMON calculation algorithm additionally requires an airport-specific reference punctuality $P_R$.

The measurable punctuality, or the measurable delay is not solely attributable to capacity bottlenecks. The measurable delay is composed of capacity-related delays and delays that can be attributed to influenceable and to non-influenceable operating process interruptions. Capacity-related delays result from a capacity triangle made up of traffic demand, operating capacity and delays, and are subject to such factors as weather, traffic mix, flight plan data, infrastructure, utilization of resources, and the air traffic control procedure. The influenceable operating process interruptions include, e.g., de-icing, staff bottlenecks, and early arrivals, while the non-influenceable operating process interruptions include, e.g., technical problems, system failures, and delays that are due to external causes.

Delays caused by operating process interruptions are delay-relevant, but not capacity-relevant. In the punctuality prediction the interruption-related delays need to be taken into consideration separately.

A special delay investigation for the Frankfurt Airport has shown that approx. 6% of all flights are delayed on a regular and non-influenceable basis, whereas the causes of delays of another 5% (with a variance of +/−5%) of all flights are influenceable. The permanent presence of interruption-related delays however means that a punctuality of 100% can not even be achieved when there are no capacity-related delays whatsoever.

Thus, the maximum achievable punctuality (maximum destination punctuality) is reached if, aside from the above-mentioned interruption-related delays, no additional capacity-related delays are present. The maximum achievable punctuality at a particular airport enters as airport-specific reference punctuality into the algorithm for calculating the punctuality in the PMON module.

Accordingly, the airport-specific reference punctuality for the Frankfurt Airport used as an example above amounts to 89% (+/−5%).

The reference punctuality is necessarily based on a reference scenario. The essential capacity- and punctuality-relevant boundary conditions therefor are the following:
infrastructure is fully available
main operating direction is active
percentage of heavies <25%
temperature >250 Celsius
vision >10 km
no wind
no precipitation
dry surface In the case of deviations from the reference scenario, the destination punctuality must first be calculated for the current scenario, for the punctuality prediction to be calculated then on this basis. As the weather deteriorates, not only the operating capacity, but also the destination punctuality decreases.

The destination punctuality $P_Z$ is calculated from the infrastructure characteristic value I, the reference punctuality $P_R$, the operating capacity $C_B$, and the correction value weather phenomenon $k_X$, the correction value wind $k_W$, the correction value aircraft mix $k_M$, and the correction value vision $k_S$. The correction values, stored in tabular form, are made use of for the punctuality calculation as a function of current weather data and weather forecasts. The reference punctuality $P_R$ is established taking the interruption-related unpunctualities into account.

$$P_Z = f(I, P_R, C_B, k_W, k_X, k_M, k_S)$$

The punctuality $P_P$ is calculated in accordance with a modified hyperbolic tangent function from the cumulative traffic demand $D_K$, the operating capacity $C_B$, and the destination punctuality $P_Z$.

$$P_P = f(D_K, C_B, P_Z)$$

Figure 2:
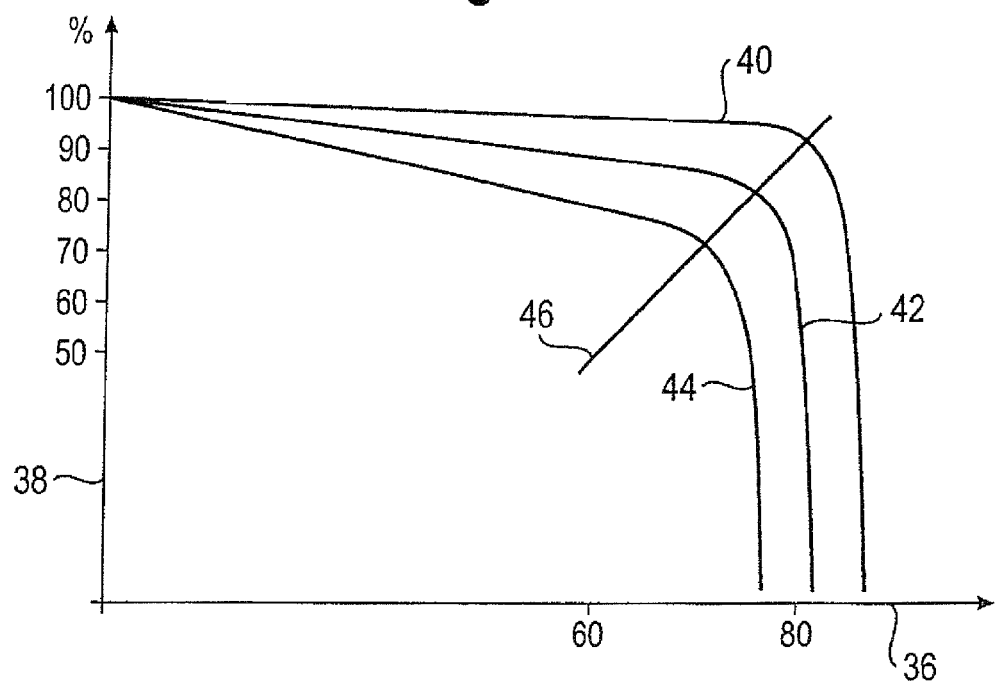
FIG. 2 shows a graphic representation of the achievable punctuality as a function of the number of aircraft movements per hour.

FIG. 2 illustrates the dependence of the punctuality rate on the traffic volume, on the capacity and on the weather. The aircraft movements per hour are plotted on the x-axis 36 while the punctuality rate is plotted on the y-axis 38. A curve 40 shows the achievable punctuality rates for good weather conditions in which flying by visual references is possible (VMC condition). A curve 42 shows the achievable punctuality rates in case of limited visibility (MMC condition), while a curve 44 is applicable for bad weather conditions in which flights must proceed under instrument flight rules (IMC condition). In curve 40 the achievable punctuality rate decreases slightly as the number of aircraft movements increases, until the punctuality rate drops rapidly as of approx. 87 aircraft movements per hour. In curve 44 this heavy drop can already be noted with about 69 aircraft movements per hour. An optimum capacity utilization is reached along a straight line 46 which marks the transition from the weakly decreasing curve area to the heavily dropping branch.

The destination, predicted, and achieved punctualities may be transmitted by PMON to external partner systems via an interface 48 (FIG. 1).

Figure 3:
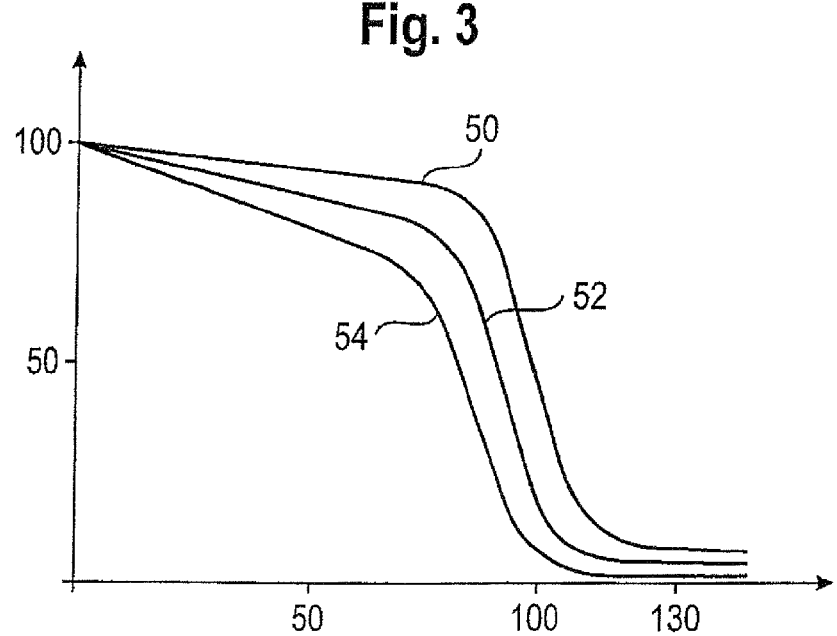
FIG. 3 shows a graphic representation of a punctuality rate as a function of the aircraft movements per hour and of capacity and of the weather.

In a similar illustration, FIG. 3 shows the punctuality rate as a function of the aircraft movements per hour, the operating capacity, and the weather. Again, the punctuality rate is plotted versus the aircraft movements per hour; however, the number of aircraft movements per hour shown is higher, and it can be seen that with an increase in the movements to over 100 no further drop in punctuality is recorded. Again, the curves 50, 52, and 54 are for VMC, MMC, and IMC weather conditions, respectively. Calculation of the curves is performed by means of a modified hyperbolic tangent function, as already explained above.

The destination, predicted, and achieved punctualities (Mov/h, Arr/h, Dep/h) are made visible to the user via a human-machine interface 48 or the interface 12.

CAPO Module

The primary object of the CAPO (Capacity Optimizer) software module is the specification of an optimum runway use to serve as a recommendation to the operating control staff.

On the basis of the operating capacity calculated and predicted by the CMON module, the CAPO module calculates the take-off and landing capacities and the predictions thereof for each 10-minute interval and for each individual runway, an optimum staggering strategy for approaching aircraft, and a recommended approach rate. A frequently used staggering strategy is, e.g., landing alternately on one out of two landing runways (staggered approach or 1:1). But the CAPO module may also suggest a different approach staggering strategy of, e.g., 2:1 (alternately two landings on a first runway and then one landing on a second runway). The approach rate is dependent on the weather and the take-off demand, among other factors, and is input as a specification into tactical traffic control devices of the air traffic control (e.g., AMAN). For example, if the weather or the take-off demand requires an increased staggering distance between the approaching aircraft, a higher value (e.g., 3.5 NM) is applied; if visibility is good or the take-off demand lower, then a lower value (e.g., 2.5 NM) is applied. The lower the approach rate set, the higher the flow of approaching traffic.

The CAPO module receives information on current or planned runway closures from external systems or by user input via an interface 56, or the interface 10.

The operating capacity $C_B$ is transferred from the CMON module to the CAPO module via the interface 22 and the ratio of the cumulative traffic demand is transferred from the DMON module to the CAPO module via the internal interface 28.

The essential influencing factors in establishing the best-possible use of the available operating capacity are the airport-specific characteristic values already described further above, which have substantially been derived from the results of extensive air traffic and weather data evaluations.

The characteristic values for the optimization function are maximum landing capacities per 10 minutes for each landing runway and maximum take-off capacities per 10 minutes for each take-off runway for all relevant weather situations (taking into consideration minimum staggerings, runway occupancy times, etc.) to avoid overload situations on individual runways.

The maximum operating capacity is made full use of whenever all parts of the runway system are used in the best possible way. The runway use strategy is thus of major significance in utilizing the available resources.

An overload operation of one runway when there is a simultaneous underload operation of another runway leads to unnecessary delays. The best punctuality values can be achieved if and when all runways are utilized as evenly as possible and the maximum capacity of each individual runway is not exceeded.

The CAPO software module optimizes the capacity utilization of the runway system by means of an optimization algorithm for which 10-minute units form the basis. With the aid of these units, predefined runway use strategies are mapped for all relevant operating conditions and variations in the operating capacities are taken into account.

The method using the units allows the operating capacity (movements, take-offs and landings) predicted by the CMON module to be converted into individual runway capacities (movements, take-offs and landings) taking into consideration a punctuality-optimized runway use concept, an optimized approach staggering strategy and an optimized approach rate.

There are two types of units, namely, take-off units (for a ratio <1) and landing units (for a ratio >=1), for different movement figures each. An ordinal number corresponds to the capacity value of one full hour, analogous to the sum of six identical units.

In a first step, units are allocated for the 10-minute sections of the next 18 hours. This is done in accordance with the following two criteria: firstly, the ratio of the floating hour decides whether it is a take-off or a landing unit and, secondly, the value of the operating capacity of the 10-minute interval from the CMON determines which ordinal number the unit receives. When allocating the ordinal number, a rounding-up is performed as of the first decimal value.

Using an example, this would mean that with a capacity value established by CMON (for the interval of 10 minutes) of 13.5 and a ratio of the floating hour of greater than one, the result established would be a landing unit with the ordinal number 84 (13,5→14*6=84).

Owing to the rounding error, in this allocation deviations are produced between the values established by the CMON module and those established by the CAPO module. This error is minimized in a first optimization step as soon as a previously determined, variably adjustable threshold value is exceeded. When the upper threshold value is exceeded, the movement figure is decreased by one movement each per 10-minute interval; upon falling below the threshold value, it is increased.

Figure 4:
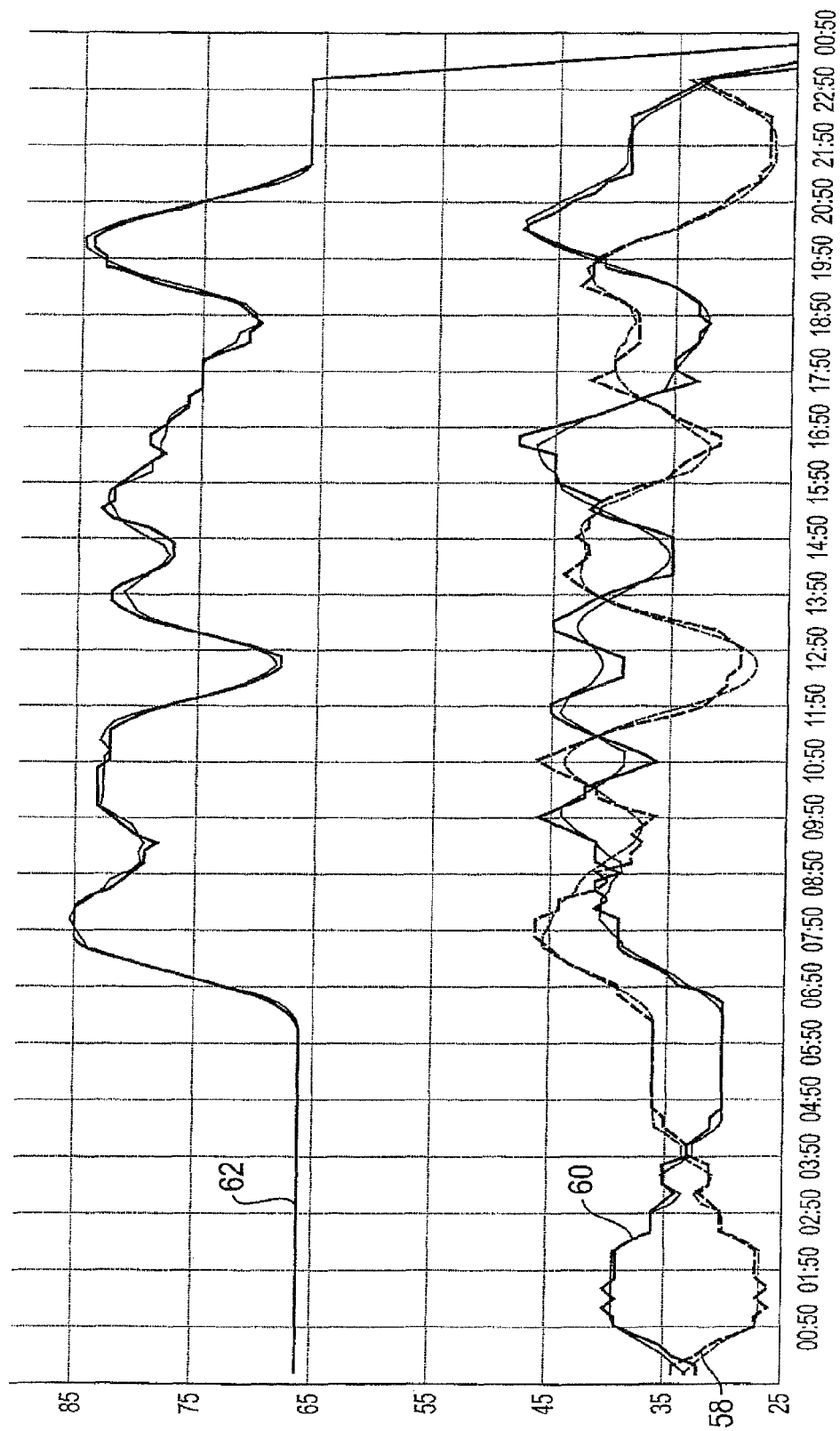
FIG. 4 shows a graphic representation of the take-offs and landings optimized according to the invention, using the Frankfurt Airport as an example, over a period of time of 24 hours.

In the second optimization step, the take-offs and landings are adapted to each other, with the movement figure remaining constant (CMON/CAPO adaptation). To this end, when a threshold value is exceeded in take-offs or landings, the units are changed correspondingly. When there are too many take-offs or too few landings, a landing unit having the same ordinal number is substituted for a take-off unit that had previously been in the place concerned. Should this place be already occupied by a landing unit, then a so-called superlanding unit is selected which possesses a higher ratio than the landing unit. The reverse is applicable in the case of too few take-offs and too many landings. FIG. 4 illustrates such an optimization process. The 24 hours of a day are reproduced on the x-axis, while the ordinal number for the respective period of time is depicted on the y-axis. A line 58 shows the capacity value established for a 10-minute landing unit and a line 60 shows the capacity value established for a 10-minute take-off unit. A line 62 shows the addition of these two values.

The approach staggering strategy results from the capacity distribution which forms the basis for the units. By stringing the units together, an optimized approach staggering strategy that is adjusted to the available capacity and to the actual traffic demand is produced over the day. By assigning an approach rate derived from the approach capacity for each unit, an optimized approach rate that is variable over the day is calculated in accordance with the same systematic procedure, taking into consideration the mean approach speed above ground, the aircraft mix, and the wind, among others.

All available landing capacity slots per landing runway and all available take-off capacity slots per take-off runway as well as the approach staggering strategy and the approach rate may be transmitted from the CAPO module to external partner systems via an interface 64, or the interface 12 (FIG. 1); the method according to the invention then operates as a control system.

By way of example, the results of the CAPO optimization for an evenly high traffic volume and a changing ratio are illustrated for the morning of one traffic day in the table below.

| | Runway West | North Runway | | South Runway | | | | Staggering | Approach |
|---|---|---|---|---|---|---|---|---|---|
| Time | Take-offs | Take-offs | Landings | Take-offs | Landings | Take-offs | Landings | Movements | strategy | Rate |
| 08:00 | 6 | 0 | 4 | 0 | 4 | 6 | 8 | 14 | Staggered | 2.5 |
| 08:10 | 5 | 2 | 3 | 0 | 4 | 7 | 7 | 14 | Staggered | 3 |
| 08:20 | 5 | 2 | 3 | 0 | 4 | 7 | 7 | 14 | Staggered | 3 |
| 08:30 | 5 | 2 | 3 | 0 | 4 | 7 | 7 | 14 | Staggered | 3 |
| 08:40 | 5 | 2 | 3 | 0 | 4 | 7 | 7 | 14 | Staggered | 3 |
| 08:50 | 5 | 2 | 3 | 0 | 4 | 7 | 7 | 14 | Staggered | 3 |
| 09:00 | 5 | 2 | 3 | 0 | 4 | 7 | 7 | 14 | Staggered | 3 |
| 09:10 | 5 | 2 | 3 | 0 | 4 | 7 | 7 | 14 | Staggered | 3 |
| 09:20 | 5 | 2 | 2 | 1 | 4 | 8 | 6 | 14 | 2:1 | 3.5 |
| 09:30 | 5 | 2 | 3 | 0 | 4 | 7 | 7 | 14 | Staggered | 3 |
| 09:40 | 5 | 2 | 3 | 0 | 4 | 7 | 7 | 14 | Staggered | 3 |
| 09:50 | 5 | 2 | 3 | 0 | 4 | 7 | 7 | 14 | Staggered | 3 |
| 10:00 | 5 | 2 | 3 | 0 | 4 | 7 | 7 | 14 | Staggered | 3 |
| 10:10 | 5 | 2 | 2 | 1 | 4 | 8 | 6 | 14 | 2:1 | 3.5 |
| 10:20 | 5 | 2 | 2 | 1 | 4 | 8 | 6 | 14 | 2:1 | 3.5 |
| 10:30 | 5 | 2 | 3 | 0 | 4 | 7 | 7 | 14 | Staggered | 3 |
| 10:40 | 5 | 2 | 3 | 0 | 4 | 7 | 7 | 14 | Staggered | 3 |
| 10:50 | 5 | 2 | 2 | 1 | 4 | 8 | 6 | 14 | 2:1 | 3.5 |
| 11:00 | 5 | 2 | 2 | 1 | 4 | 8 | 6 | 14 | 2:1 | 3.5 |
| 11:10 | 6 | 0 | 4 | 0 | 4 | 6 | 8 | 14 | Staggered | 2.5 |
| 11:20 | 5 | 2 | 2 | 1 | 4 | 8 | 6 | 14 | 2:1 | 3.5 |
| 11:30 | 5 | 2 | 2 | 1 | 4 | 8 | 6 | 14 | 2:1 | 3.5 |

-continued

| Time | Runway West Take-offs | North Runway Take-offs | North Runway Landings | South Runway Take-offs | South Runway Landings | Take-offs | Landings | Movements | Staggering strategy | Approach Rate |
|---|---|---|---|---|---|---|---|---|---|---|
| 11:40 | 5 | 2 | 2 | 1 | 4 | 8 | 6 | 14 | 2:1 | 3.5 |
| 11:50 | 6 | 0 | 4 | 0 | 4 | 6 | 8 | 14 | Staggered | 2.5 |
| 12:00 | 5 | 2 | 2 | 1 | 4 | 8 | 6 | 14 | 2:1 | 3.5 |

Figure 5:
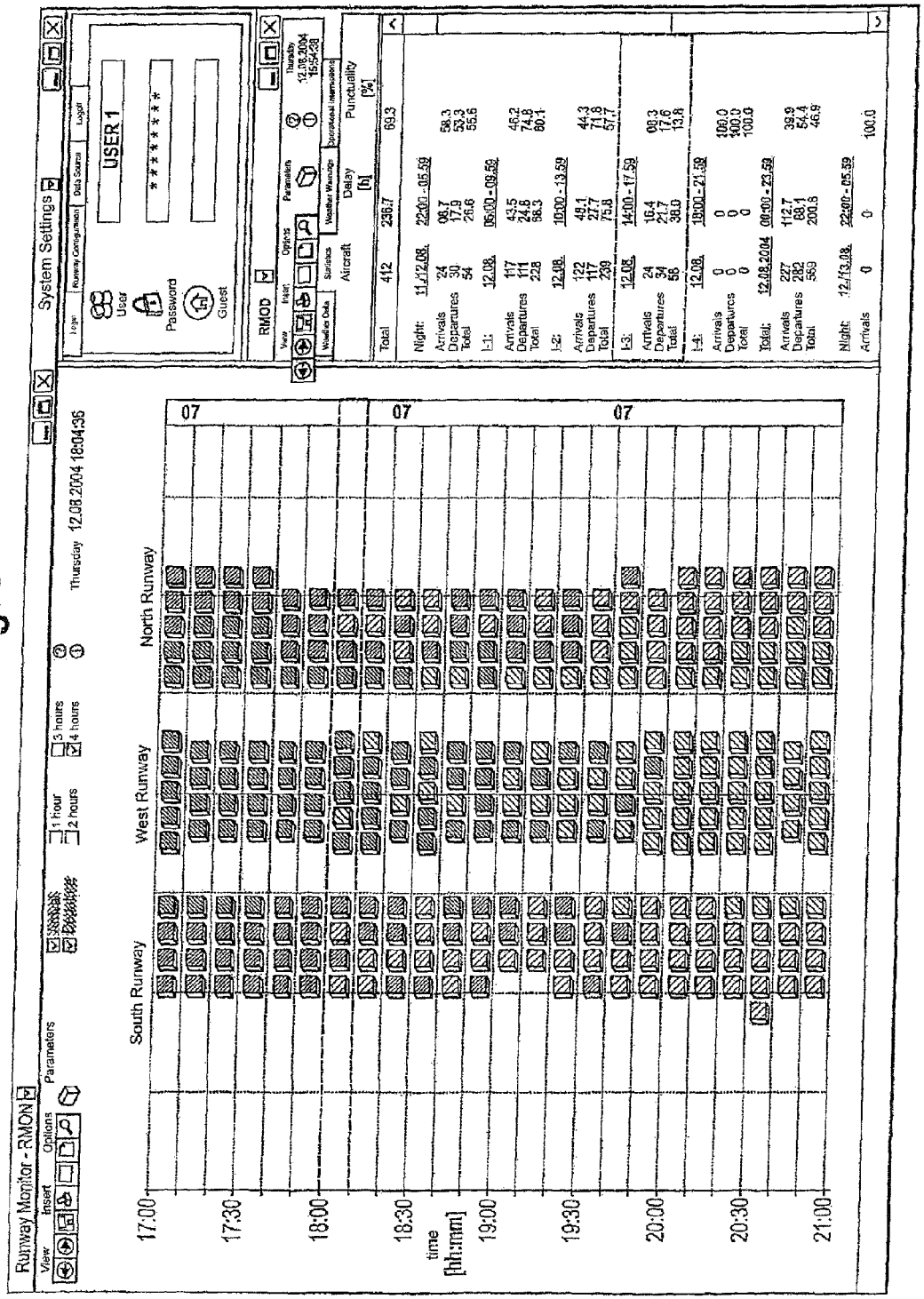
FIG. 5 shows a graphical surface of a control system according to the invention.

One possible graphical representation of the capacities established by the CAPO module is shown by way of example in FIG. 5. For the three runways of the Frankfurt Airport, i.e. the South Runway, the West Runway and the North Runway, the number of available slots in the form of small cuboids is illustrated as a function of time, which is plotted on a vertical axis on the left-hand side. Different colors may be used here to distinguish between landing capacity slots and take-off capacity slots, while further information may be transmitted by means of the brightness of the colors. The operating control staff thus receives the results of the capacity optimization per runway, comprehensible at a glance.

Figure 6:
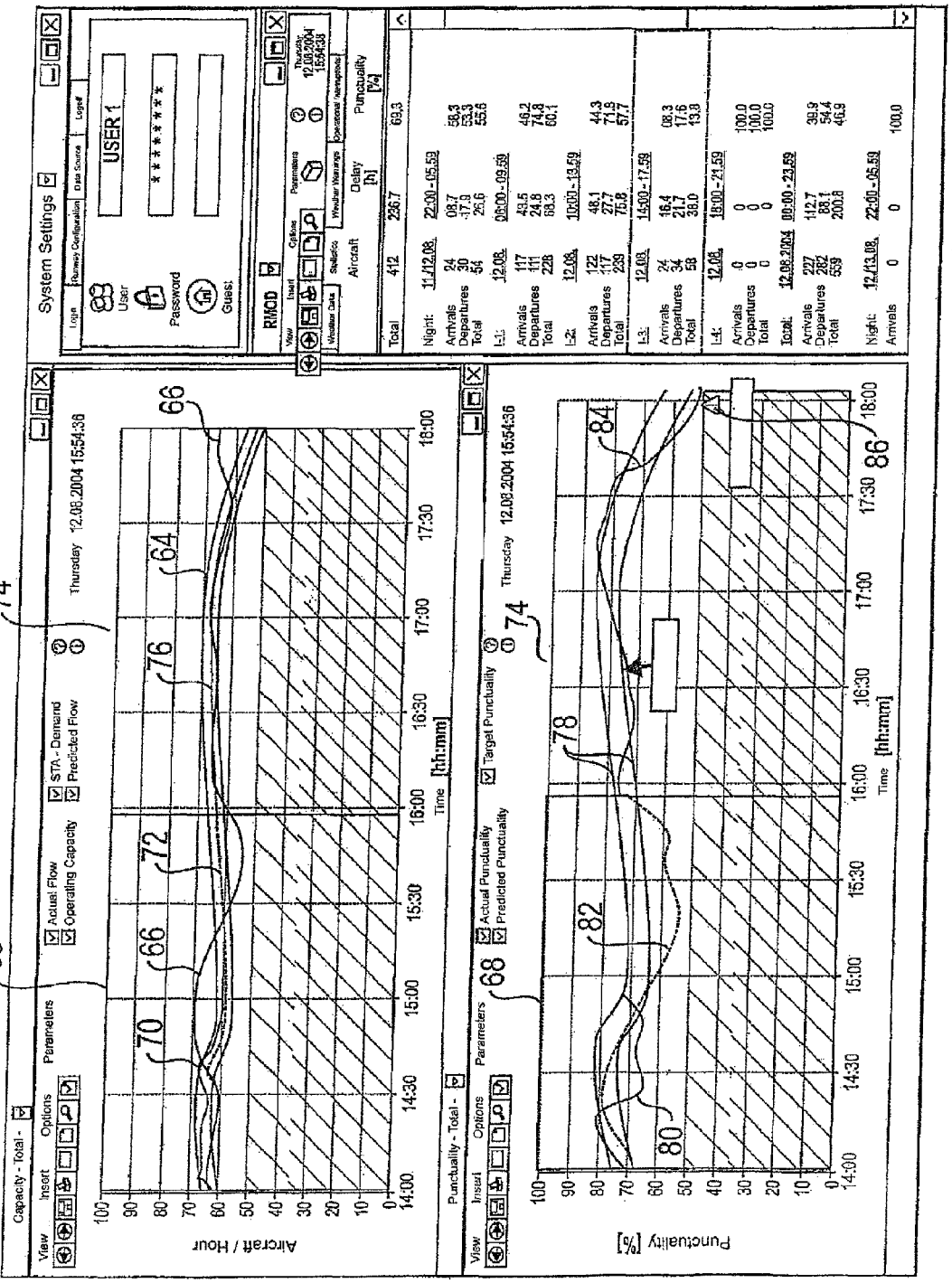
FIG. 6 shows a graphical surface of an information system according to the invention.

When the method according to the invention is used in an information system, the information is displayed on a screen via a graphical interface. The CAPMAN HMI (human-machine interface) may be comprised of several, e.g. three, screens which indicate all relevant information about the total traffic, inbound traffic, and outbound traffic at the same time. FIG. 6 shows an exemplary screen on which the total capacity and the punctuality are displayed as a function of the weather.

In the capacity chart (top), a band 64 provides information about the capacity and a line 66 provides information about the traffic demand. In an area 68, the air traffic (flow) handled is indicated by a line 70 for the past period of time, and the flow predicted in the past is indicated as a dotted line 72 for quality control of the prediction. In an area 74 the predicted flow is illustrated for the next few hours as a continuous line 76.

The punctuality chart (bottom) in FIG. 6 illustrates the punctuality target in the form of a target area by parallel black lines 78. For the past period of time 68, the actually achieved punctuality is shown as a continuous line 80 and the punctuality predicted in the past is shown as a dotted line 82 for quality control of the prediction. In the area 74 the predicted punctuality is illustrated for the next few hours as a continuous line 84.

When the predicted punctuality leaves the punctuality target area (warning triangle 86), a warning is issued and the operating control staff has to decide whether any traffic control measures need to be initiated.

In the input field at the top right, the user and system settings are input and displayed; the display field at the bottom right is an information field. It may give information on, e.g., the current and the predicted weather or on the current and the past flow.

In this way, CAPMAN HMI informs the operating control staff of the currently available airside capacity and the airside capacity to be expected within the next few hours (operating capacity) as a function of the current and the predicted weather.

In addition, CAPMAN HMI provides information about the current traffic demand and the traffic demand to be expected within the next few hours and about the expected punctuality of the air traffic, resulting from the capacity/demand ratio.

Corresponding to the weather prediction of the German Meteorological Service (DWD), CAPMAN HMI has a prediction horizon of up to 18 hours. It therefore constitutes an early warning system to recognize foreseeable capacity bottlenecks and enables the operating control staff to initiate target-oriented traffic control measures in good time.

It is only the detailed knowledge gained by means of CAPMAN of the arrival and departure capacities variable over the time axis for each runway that allows the optimum utilization of the airport capacities available on the airside.

By correlating the capacities with the traffic demand, CAPMAN provides information about current and predicted punctualities and in this way recognizes, at an early stage, any capacity bottlenecks developing. Upon falling below defined punctuality minimum values, CAPMAN provides timely notice that the necessary and target-oriented traffic control measures be taken.

When CAPMAN is coupled to traffic control systems such as AMAN and DMAN, CAPMAN transfers the capacity data and the operative control data to the partner systems and allows these systems to perform the automated traffic optimization in the runway system. CAPMAN provides the basis for system-assisted optimization of capacity utilization and for enhancement of punctuality of the air traffic at the airport, in particular in case of a reduced capacity due to, e.g., bad weather.

The invention claimed is:

1. A method for optimized use of the airside capacities of an airport, using an electronic data processing system, wherein
  a current operating capacity of the airport is calculated;
  a current traffic demand is calculated;
  information for an optimized use of the available resources is determined and outputted based on the current operating capacity and the current traffic demand;
  an operating capacity prediction for the airport is calculated;
  an expected and a cumulative traffic demand as well as a ratio in the cumulative traffic demand between arrivals and departures are calculated; and
  based on the operating capacity prediction and the ratio between arrivals and departures, a take-off capacity and a landing capacity are determined for each runway in predetermined time intervals.

2. The method according to claim 1, wherein, based on the calculated take-off and landing capacities for each runway, an optimum runway use strategy is determined and outputted.

3. The method according to claim 1, wherein, based on the calculated take-off and landing capacities, an optimum approach staggering strategy and an optimum approach rate are established for each landing runway.

4. The method according to claim 1, wherein the current operating capacity is calculated from airport-specific infrastructure characteristic values, airport-specific operational characteristic values, and airport-specific weather characteristic values as well as from current operating, weather, and weather forecast data entered online.

5. The method according to claim 4, wherein the airport-specific infrastructure characteristic value is determined using an algorithm which takes into account an active runway configuration, an operational dependence between individual runways, breakdown of a runway, and predicted wind conditions.

6. The method according to claim 4, wherein the airport-specific weather characteristic values are stored in tabular form and are retrieved in accordance with the current weather/weather forecast data.

7. The method according to claim 1, wherein the expected traffic demand is calculated from flight plan data and flight status data entered online.

8. The method according to claim 1, comprising calculating an achievable, a predicted, and an actually achieved punctuality.

9. The method according to claim 8, wherein the achievable punctuality is calculated from a reference punctuality of the airport, from airport-specific infrastructure characteristic values, operational characteristic values, and weather characteristic values, and from the current operating capacity.

10. The method according to claim 9, wherein the reference punctuality takes interruption-related delays into account.

11. The method according to claim 8, wherein the predicted punctuality is calculated in accordance with a modified hyperbolic tangent function from the cumulative traffic demand, the current operating capacity, and the achievable punctuality.

12. The method according to claim 1, wherein at least one of the following items of information is outputted to a graphical user interface:
information for an optimized use of the available runways;
take-off capacity for each runway in predetermined time intervals;
landing capacity for each runway in predetermined time intervals;
operating capacity prediction;
current traffic demand;
traffic flow;
cumulative traffic demand;
achievable punctuality;
predicted punctuality;
actually achieved punctuality;
staggering strategy; and
approach rate.

13. The method according to claim 1, wherein at least one of the following items of information is transferred to an electronic control system:
information for an optimized use of the available runways;
take-off capacity for each runway in predetermined time intervals;
landing capacity for each runway in predetermined time intervals;
operating capacity prediction;
current traffic demand;
traffic flow;
cumulative traffic demand;
achievable punctuality;
predicted punctuality;
actually achieved punctuality;
staggering strategy; and
approach rate.

14. An information system comprising an electronic data processing system which executes a software program that is used for calculating at least one of the following items of information by the method according to claim 1:
information for an optimized use of the available runways;
take-off capacity for each runway in predetermined time intervals;
landing capacity for each runway in predetermined time intervals;
operating capacity prediction;
current traffic demand;
traffic flow;
cumulative traffic demand;
achievable punctuality;
predicted punctuality;
actually achieved punctuality;
staggering strategy; and
approach rate, and further comprising a screen for displaying the calculated item of information.

15. A control system for optimizing the runway use of an airport using the method of claim 1, the control system comprising:
a device for calculating the current operating capacity of the airport;
a device for calculating the current traffic demand;
a device for outputting information for an optimized use of the available runways, which is calculated from the current operating capacity and the current traffic demand
a device for calculating an operating capacity prediction for the airport;
a device for calculating an expected and a cumulative traffic demand as well as a ratio in the cumulative traffic demand between arrivals and departures; and
a device for determining a take-off capacity and a landing capacity for each runway in predetermined time intervals based on the operating capacity prediction and the ratio between arrivals and departures.

16. An article of manufacture comprising an information storage medium having computer readable program code disposed thereon for executing the method according to claim 1.

17. The article of manufacture according to claim 16, comprising
a first software module (CMON) for calculating the current operating capacity;
a second software module (DMON) for calculating the current traffic demand;
a third software module (CAPO) for calculating the optimum use of capacity;
the first and second software modules including interfaces to external systems via which they receive current online data;
the first and second software modules mutually interchanging data; and
the first and second software modules delivering data to the third software module, which calculates information therefrom for an optimized use of the available resources and outputs it.

18. A method for optimized use of the airside capacities of an airport, using of an electronic data processing system, wherein
a current operating capacity of the airport is calculated;
a current traffic demand is calculated; and
information for an optimized use of the available resources is determined and outputted based on the current operating capacity and the current traffic demand;
wherein the current operating capacity is calculated from airport-specific infrastructure characteristic values, airport-specific operational characteristic values, and airport-specific weather characteristic values as well as from current operating, weather, and weather forecast data entered online; and wherein
the airport-specific infrastructure characteristic value is determined by means of an algorithm which takes into account an active runway configuration, an operational dependence between individual runways, breakdown of a runway, and predicted wind conditions.

19. An article of manufacture comprising an information storage medium having computer readable program code disposed thereon for executing the method according to claim 18.

20. The article of manufacture according to claim 19, comprising
a first software module (CMON) for calculating a current operating capacity;
a second software module (DMON) for calculating a current traffic demand;
a third software module (CAPO) for calculating an optimum use of capacity;
the first and second software modules including interfaces to external systems via which they receive current online data;
the first and second software modules mutually interchanging data; and
the first and second software modules delivering data to the third software module, which calculates information therefrom for an optimized use of the available resources and outputs it.

21. A method for optimized use of the airside capacities of an airport, wherein using an electronic data processing system, wherein
a current operating capacity of the airport is calculated;
a current traffic demand is calculated;
information for an optimized use of the available resources is determined and outputted based on the current operating capacity and the current traffic demand; and
an achievable, a predicted, and an actually achieved punctuality is calculated.

22. An article of manufacture comprising an information storage medium having computer readable program code disposed thereon for executing the method according to claim 21.

23. The article of manufacture according to claim 22, comprising
a first software module (CMON) for calculating a current operating capacity;
a second software module (DMON) for calculating a current traffic demand;
a third software module (CAPO) for calculating an optimum use of capacity; and
a fourth software module (PMON) for calculating a punctuality;
the first and second software modules including interfaces to external systems via which they receive current online data;
the first and second software modules mutually interchanging data; and
the first and second software modules delivering data to the third software module, which calculates therefrom and outputs information for an optimized use of the available resources; and
the fourth software module receiving data from the first and second software modules and calculating therefrom and outputting an achievable, a predicted, and an actually achieved punctuality.

24. An article of manufacture comprising an information storage medium having computer readable program code disposed thereon, wherein said computer readable program code is usable with an electronic data processing system for executing a method for optimized use of the airside capacities of an airport, wherein
a current operating capacity of the airport is calculated;
a current traffic demand is calculated;
information for an optimized use of the available resources is determined and outputted based on the current operating capacity and the current traffic demand, the article of manufacture comprising
a first software module (CMON) for calculating the current operating capacity;
a second software module (DMON) for calculating the current traffic demand;
a third software module (CAPO) for calculating the optimum use of capacity;
the first and second software modules including interfaces to external systems via which they receive current online data;
the first and second software modules mutually interchanging data; and
the first and second software modules delivering data to the third software module, which calculates information therefrom for an optimized use of the available resources and outputs it.

* * * * *